United States Patent
Paulsen (10) Patent No.: US 9,268,452 B2
(45) Date of Patent: Feb. 23, 2016

(54) CANCELLING INDUCED CURRENTS IN A TOUCH SENSING DEVICE HAVING AN EMBEDDED NEAR FIELD COMMUNICATION ANTENNA

(71) Applicant: CIRQUE CORPORATION, Salt Lake City, UT (US)

(72) Inventor: Keith L. Paulsen, Centerville, UT (US)

(73) Assignee: CIRQUE CORPORATION, Salt Lake City, UT (US)

(*) Notice: Subject to any disclaimer, the term of this patent is extended or adjusted under 35 U.S.C. 154(b) by 0 days.

(21) Appl. No.: 14/596,063

(22) Filed: Jan. 13, 2015

(65) Prior Publication Data

US 2015/0130765 A1 May 14, 2015

Related U.S. Application Data

(63) Continuation of application No. 13/544,456, filed on Jul. 9, 2012, now Pat. No. 8,933,901.

(60) Provisional application No. 61/505,350, filed on Jul. 7, 2011.

(51) Int. Cl.
| | |
|---|---|
| *G06F 3/044* | (2006.01) |
| *G09G 5/00* | (2006.01) |
| *G06F 3/041* | (2006.01) |
| *G06F 3/046* | (2006.01) |
| *H01Q 1/22* | (2006.01) |

(52) U.S. Cl.
CPC ............. *G06F 3/044* (2013.01); *G06F 3/046* (2013.01); *G06F 3/0418* (2013.01); *G09G 5/00* (2013.01); *H01Q 1/22* (2013.01); *G06F 2203/04107* (2013.01)

(58) Field of Classification Search
CPC .. G06F 3/044; G06F 2203/04107; H01Q 1/22
See application file for complete search history.

(56) References Cited

U.S. PATENT DOCUMENTS

| 6,025,816 A | 2/2000 | Dent et al. |
|---|---|---|
| 2004/0095336 A1* | 5/2004 | Hong ...................... G06F 3/045 345/173 |
| 2004/0105040 A1* | 6/2004 | Oh ....................... G02F 1/13338 349/12 |
| 2004/0155871 A1 | 8/2004 | Perski et al. |
| 2008/0309623 A1 | 12/2008 | Hotelling et al. |
| 2010/0265189 A1* | 10/2010 | Rofougaran ............ G06F 3/046 345/173 |
| 2011/0012794 A1 | 1/2011 | Schlub et al. |

* cited by examiner

*Primary Examiner* — Shaheda Abdin
(74) *Attorney, Agent, or Firm* — Morriss O'Bryant Compagni, PC (57) ABSTRACT

A method and system for enabling a near field communication antenna to be disposed adjacent to electrodes of a touch sensing device, the near field communication antenna being operated, and the magnetic field inductance and electric field coupling between the electrodes and the near field communication antenna being minimized in order to substantially reduce or eliminate induced currents on the electrodes.

12 Claims, 7 Drawing Sheets

CANCELLING INDUCED CURRENTS IN A TOUCH SENSING DEVICE HAVING AN EMBEDDED NEAR FIELD COMMUNICATION ANTENNA

CROSS REFERENCE TO RELATED APPLICATIONS

This document claims priority to and incorporates by reference all of the subject matter included in the provisional patent application, having Ser. No. 61/505,350, filed Jul. 7, 2011.

BACKGROUND OF THE INVENTION

1. Field of the Invention

This invention relates generally to the use of a near field communication antenna and a touch sensing device, wherein the antenna and the touch sensing device are used in close proximity to each other such that the near field communication antenna can interfere with operation of the touch sensing device.

2. Description of Related Art

The present invention describes the use of a touch sensing device in combination with a near field communication (NFC) antenna. The use of the term "touch sensing device" should be considered as interchangeable with the terms "touchpad", "touch screen" and "touch sensitive device". Likewise, the term near field communication antenna should be considered as interchangeable with the terms "contactless card reader", "RFID reader" and "blue tooth antenna". Furthermore, the "systems" referred to will include a combination of a touch sensing device and a near field communication antenna, using all of the interchangeable terms.

There are several designs for capacitance sensitive touchpads. It is useful to examine the underlying technology to better understand how any capacitance sensitive touchpad can be modified to work with the present invention.

Figure 1:
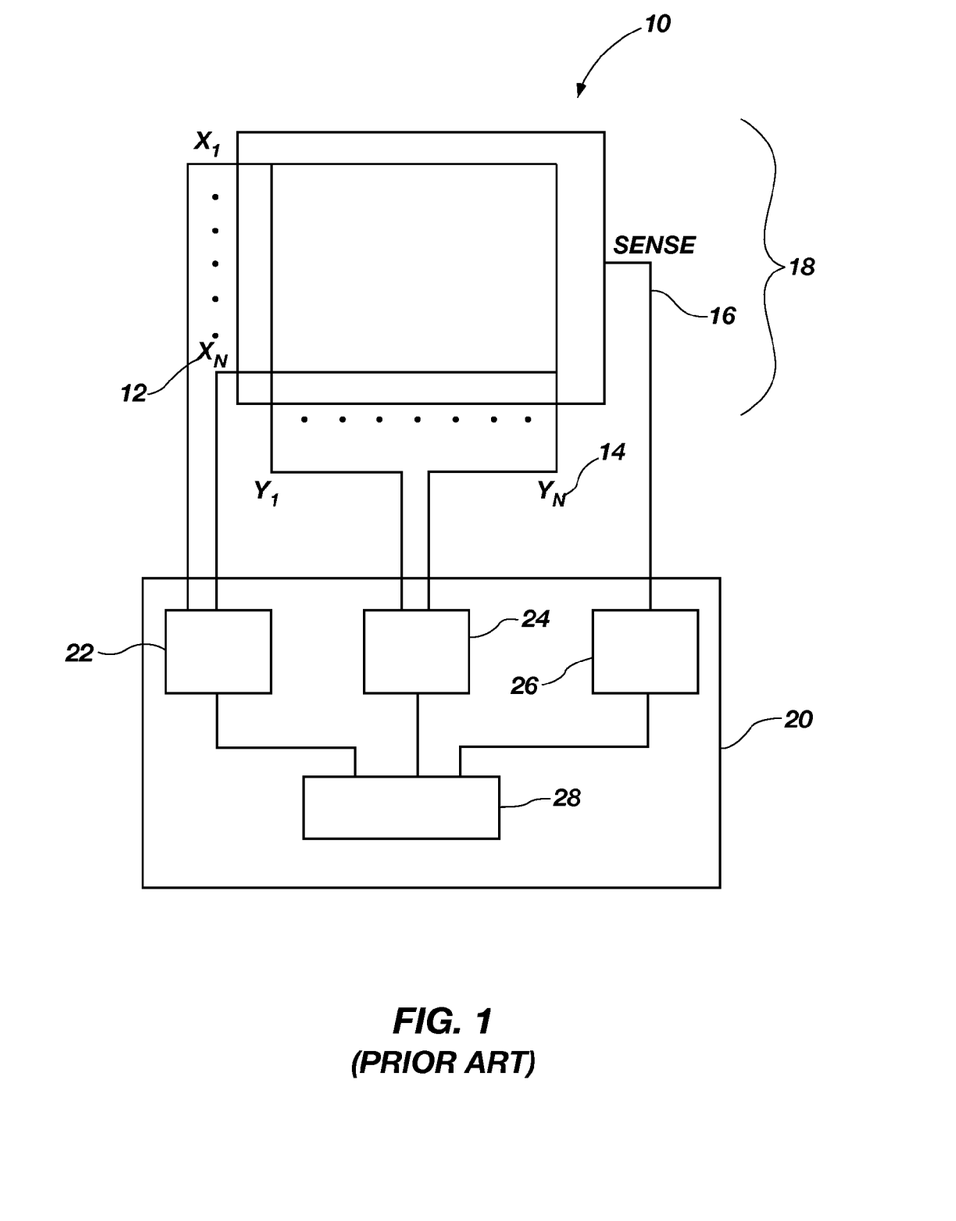
FIG. 1 is a block diagram of the components of a capacitance-sensitive touchpad as made by CIRQUE® Corporation and which can be successfully operated in conjunction with a near field communication antenna.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

One problem with integrating a near field communication antenna and a touch sensing device is interference. For example, the strong magnetic field necessary to power a near field communication antenna that is used as a contactless card reader may create strong eddy currents within electrodes of the touch sensing device, thereby causing operation outside of specifications, and malfunctions or inoperability is the result. Similarly, a near field communication antenna can electrically couple to the electrodes of the touch sensing device. Thus, a near field communication antenna may cause magnetic field inductance and electric field coupling with the touch sensing device.

In a related interference problem, the touchpad creates strong electrostatic fields that are necessary to detect a finger. These strong fields often cause the near field communication antenna to have insufficient signal integrity.

The adverse effects of the both electrostatic field coupling and magnetic field inductance may be a result of 1) the near field communication antenna signal causing non-linear effects due to noise/interference signal levels being large enough to trigger ESD diodes in touch sensing device circuitry, 2) difficulty for the touch sensing device front-end electronics or analog-to-digital converters (ADCs) in tracking the interference also causing non-linear effects and error in measurement, and 3) the amplitude modulation frequency of near field communications is often very close to the touch sensing stimulus frequency, thereby creating in-band ground bounce.

It would be a further advantage to dispose the circuitry of the near field communication antenna and the touch sensing device near enough to each other to prevent eavesdropping or tapping into the signals between them to thereby provide an integrated system that is more secure than existing integrated systems. Furthermore, it would be an advantage to remove the electrical and magnetic interaction between them. Finally, it would also be of benefit to integrate the electronics into a single package to address the very limited space of the touch sensing device and the NEAR FIELD COMMUNICATION antenna and associated routing space typical of today's electronic appliances.

BRIEF SUMMARY OF THE INVENTION

In a first embodiment, the present invention is a method and system for enabling a near field communication antenna to be disposed adjacent to electrodes of a touch sensing device, the near field communication antenna being operated, and the magnetic field inductance and electric field coupling between the electrodes and the near field communication antenna being minimized in order to substantially reduce or eliminate induced currents on the electrodes.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 2:
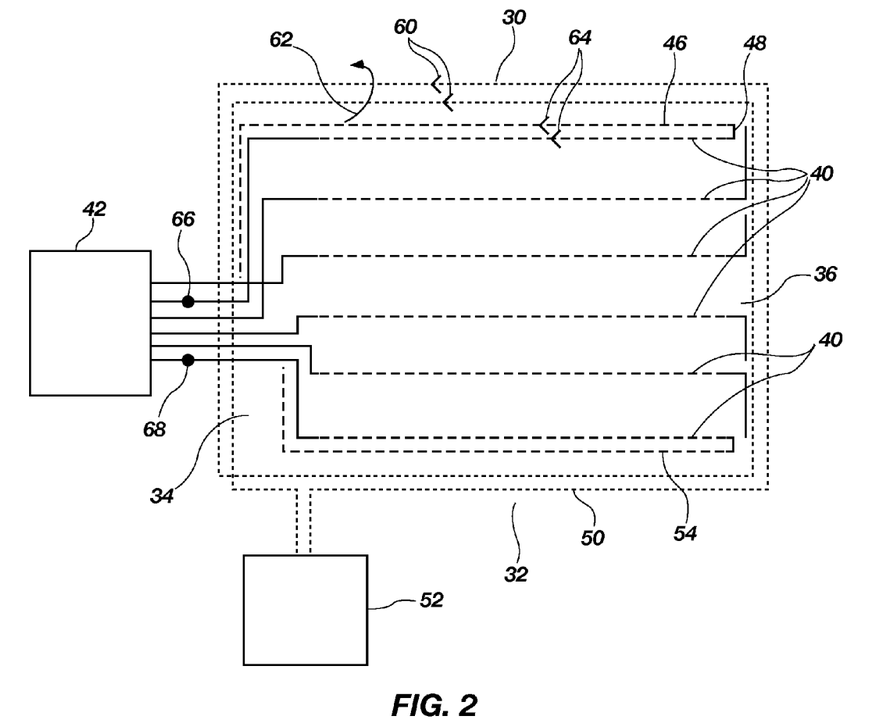
FIG. 2 is a diagram that illustrates a layout for a near field communication antenna and electrodes of a touch sensing device.

FIG. 2 is a diagram of electrodes of a near field communication antenna and electrodes of a touch sensing device. The present invention may be implemented in electrodes 40 of a touch sensing device 42 that are adjacent to a near field communication antenna 50. For the purposes of this document, the term adjacent implies that operation of the near field communication antenna 50 may influence operation of the electrodes 40 by inducing current flow in the electrodes.

In this first embodiment, the near field communication antenna 50 is disposed in a same plane as the electrodes 40. However, the near field communication antenna 50 may be in a different plane but substantially parallel plane as the electrodes 40, either above or below. Furthermore, the electrodes 40 may be part of a touchpad, a touch screen, or any other touch sensing device as is known to those skilled in the art.

The near field communication antenna 50 is shown as being a loop of wire that is wound twice around the electrodes 40. This specific layout or configuration for the near field communication antenna 50 is for illustration purposes only and should not be considered as limiting. The near field communication antenna 50 may be formed as a partial loop, a single loop or multiple loops around the electrodes 40.

The first embodiment is directed to minimizing, reducing or substantially eliminating interference between the near field communication antenna and the electrodes 40 of the touch sensing device 42 when the near field communication antenna is operated. Reduced, minimized or substantially eliminated interference is defined as interference that is too small to prevent operation of the near field communication antenna 50 or the electrodes 40 of the touch sensing device 42.

In the first embodiment, functions of the near field communication antenna 50 include, but should not be considered limited to, wireless communication functions such as using a contactless card reader for communication with a smart card, reading a smart card at keyless entry systems, or any other functions that require near field communication. The near field communication antenna 50 may or may not use relatively high voltages when compared to the voltages on the electrodes 40 of a touch sensing device 42. Near field communication antennas are known to use voltages at least as high as 60 volts, while touch sensing devices may operate nearer to 5 volts. These voltages are only examples, and the systems are capable of operating at other voltages.

FIG. 2 is a first embodiment that may reduce or substantially eliminate interference by a near field communication antenna 50 on the electrodes 40. The near field communication antenna 50 is connected to near field communication circuitry 52. The electrodes 40 are connected to touch sensing device circuitry 42.

For this example, current is flowing through the near field communication antenna 50 as shown by arrows 60. A magnetic field is generated around the near field communication antenna 50 in the direction as shown by curved arrow 62. Electrodes 40 that are nearest to the near field communication antenna 50 may have induced currents caused by the magnetic field generated by the near field communication antenna 50.

The electrodes 40 are arranged to form a sensing area that may be a series of parallel rows of electrodes extending from a top edge 30 to a bottom edge 32 of the sensing area, each of the plurality of electrodes being electrically separate from each other. Each of the plurality of electrodes 40 follows a path that is beginning at a first edge 34 and ends at an opposite second edge 36 of the sensing area.

To reduce or substantially eliminate the tendency of the magnetic field to induce currents on the electrode 46, the electrode is made to pass through the magnetic field twice. This is accomplished by extending the length of the electrode 46 at location 48 so that it is now twice as long as other electrodes 40 in the sensing area that is used for detecting objects. Because the electrode 46 may be essentially folded back on itself so that it spans the distance between opposites sides of the near field communication antenna 50 two times, the sum of current at location 66 may be reduced or substantially eliminated.

The electrode 54 that is shown near the bottom of the electrodes 40 is also shown as spanning the distance twice between opposite sides of the near field communication antenna 50. Thus, the sum of current at location 68 may be reduced or substantially eliminated.

The electrodes 40 that are not immediately adjacent to the top or bottom edges of the near field communication antenna 50 are not shown as being doubled in length. This is because the effect of the magnetic field around the near filed communication antenna 50 may diminish rapidly. However, any electrode 40 that experiences magnetically induced currents can be made to travel back and forth between sides of the near field communication antenna 50 so as to eliminate the effect of induced currents. Therefore, this example should not be considered as limiting, but only as an illustration of principles of the present invention that demonstrate how to reduce or eliminate induced currents in the electrodes 40.

While FIG. 2 illustrates the ability to reduce induced currents because of magnetic fields generated by the near field communication antenna 50, it may not address the problems of electrostatic fields that couple to the electrodes 40. Current flow through the near field communication antenna 50 also creates an electrostatic field around the near field communication antenna 50 that can couple to the electrodes 40 and also induce current flow.

Figure 3:
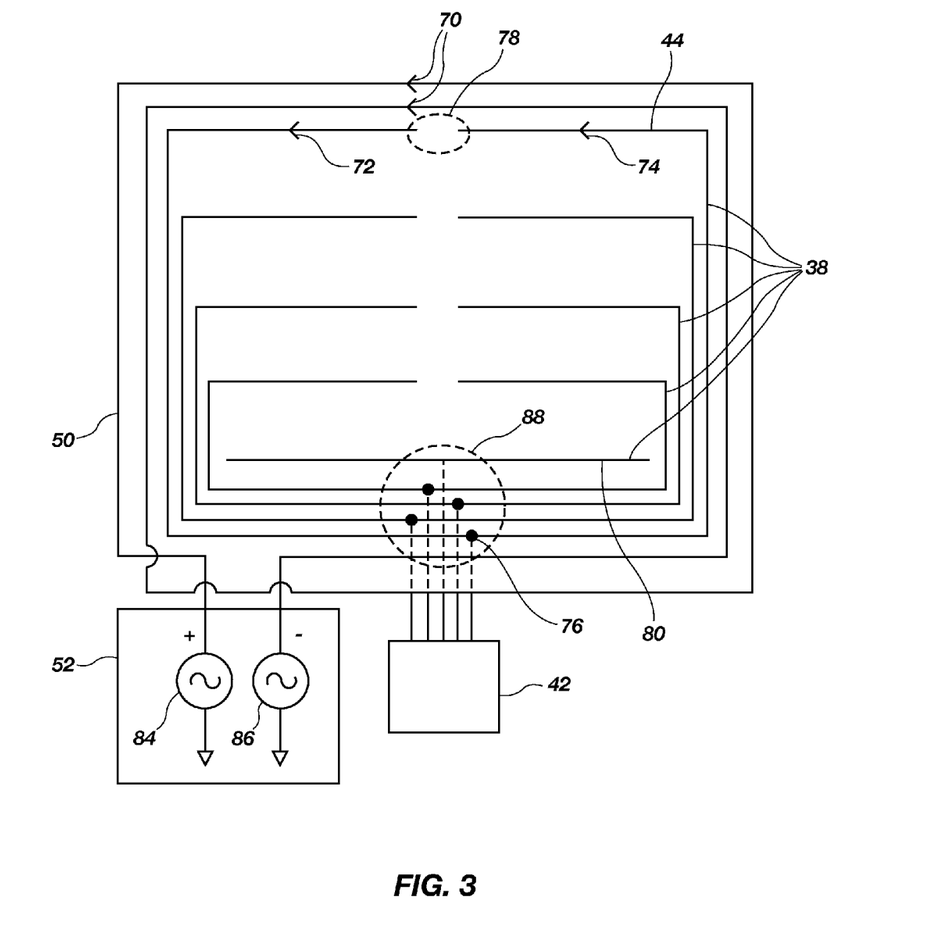
FIG. 3 is a diagram that illustrates a different layout for electrodes of the touch sensing device.

FIG. 3 is provided as a top view of a near field communication antenna 50 connected to near field communication antenna circuitry 52, wherein the antenna is disposed around electrodes 40 that are connected to touch sensing circuitry 42.

In FIG. 3, a sensing area is now formed from a series of concentrically aligned partial electrode loops 38, the partial loops all being electrically open at a first location 78, and having a connection to touch sensing circuitry 42 at an opposite second location 88. Each of the partial electrode loops 38 may have two arms of substantially equal length. The induced current in a first arm of each of the plurality of concentrically aligned partial electrode loops 38 may be equal and opposite to the induced current in a second arm.

There may also be an electrode 90 of the electrodes 38 that is not formed as a partial loop but is instead formed as a "T" shape. This electrode 90 will be affected by the coupling of current from the near field communication antenna 50 in the same manner as all of the partial electrode loops 38 because it also has two arms of substantially equal length.

In FIG. 3, arrows 70 show the direction of current flow in the near field communication antenna 50 in a moment of time. The direction of current flow may change because the signal source is an AC current, but for this moment in time, current flow 70 is in the indicated direction. Electrode 44 is shown as being split into two arms of approximately equal length. The magnetic field induces current in electrode 44 as indicated by arrows 72 and 74. The sum of the current at point 76 is thus reduced or substantially eliminated.

It should be understood that the scale and spacing of the electrodes 38 and the near field communication antenna 50 is for illustration purposes only and should not be considered as limiting.

With the magnetic field accounted for, it may be possible to also affect current that is coupled from electrostatic fields. The electrostatic fields generated by the near field communication antenna 50 can also be coupled into the electrodes 38 because the current on the near field communication antenna is an AC current.

Figure 4:
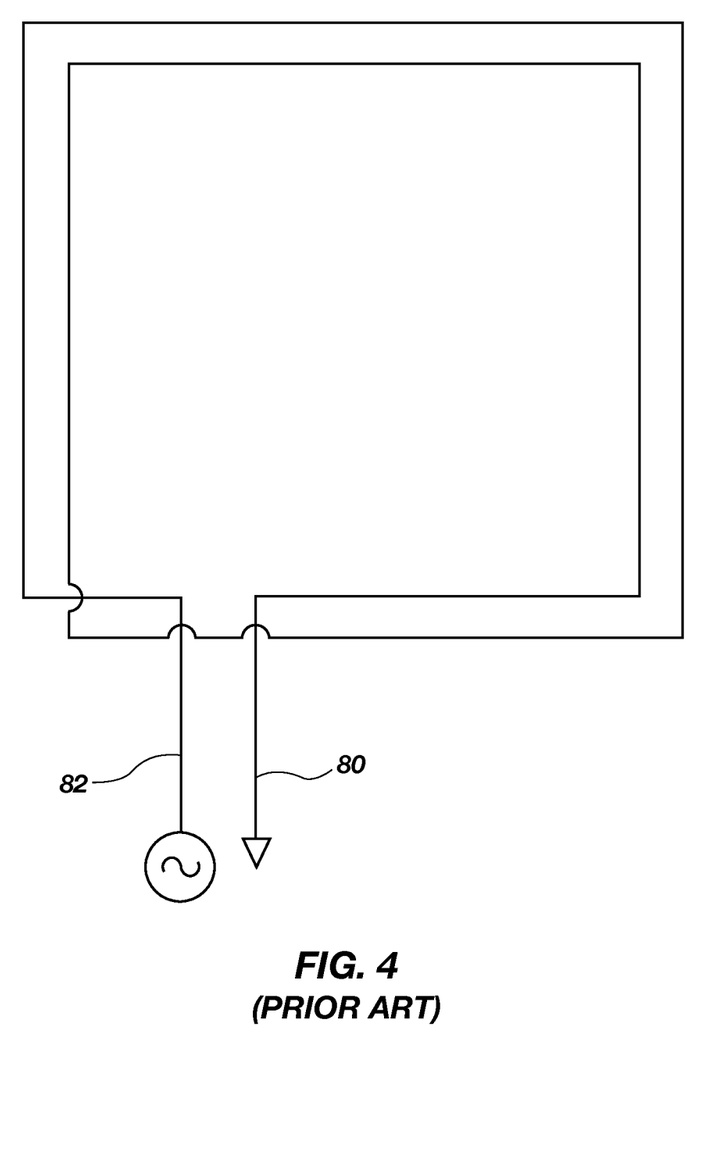
FIG. 4 is a diagram of a near field communication antenna and a signal source that will couple currents to electrodes of a touch sensing device.
Figure 5:
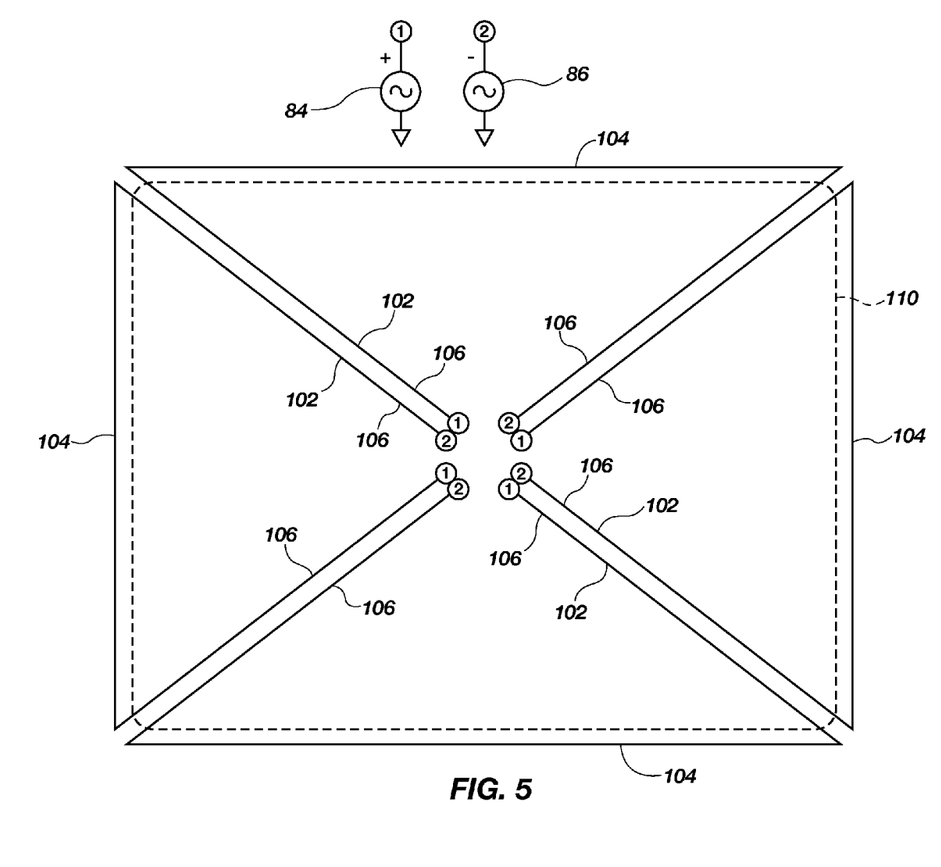
FIG. 5 is a diagram showing an alternative embodiment of a near field communication antenna.
Figure 6:
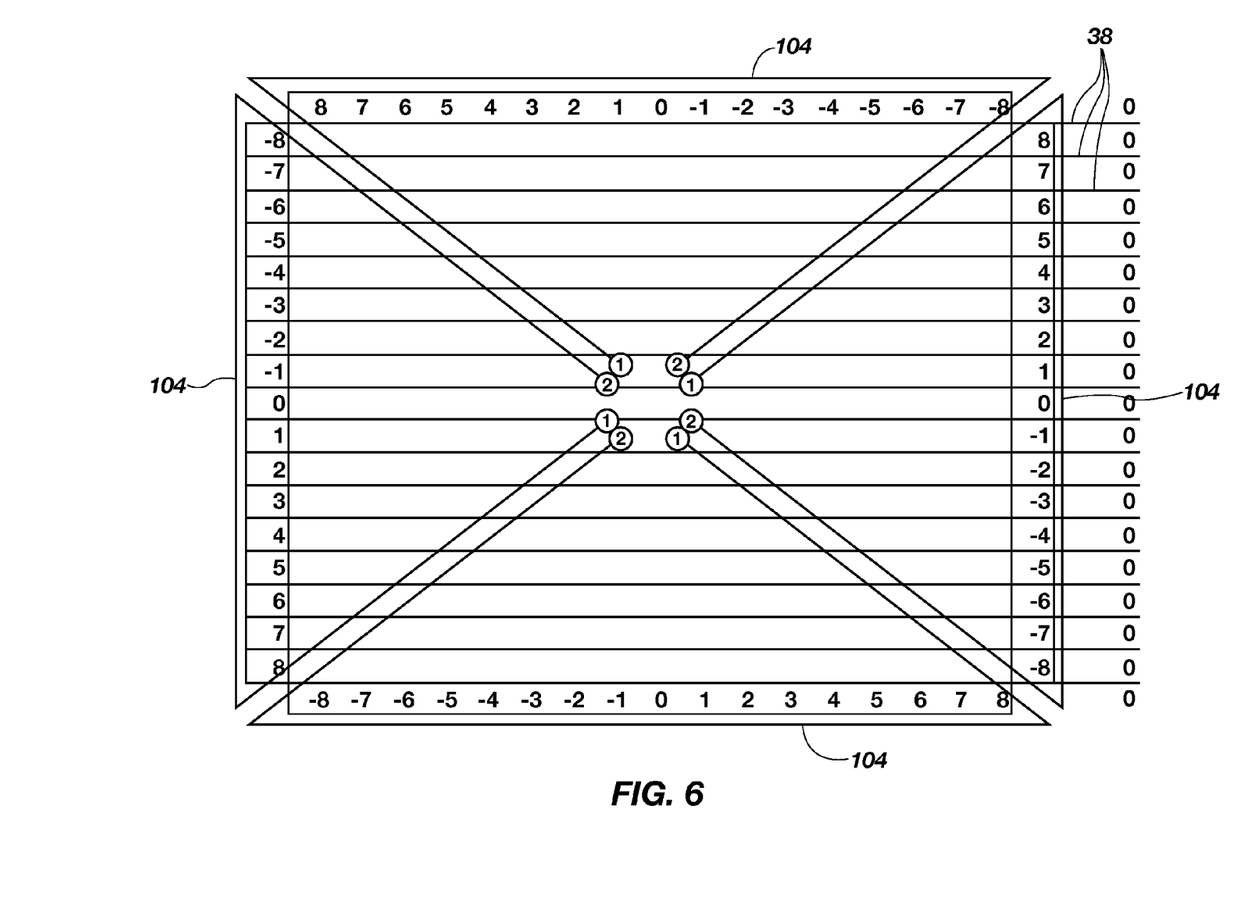
FIG. 6 is a diagram showing additional detail of the electrode grid that is combined with the alternative near field communication antenna.
Figure 7:
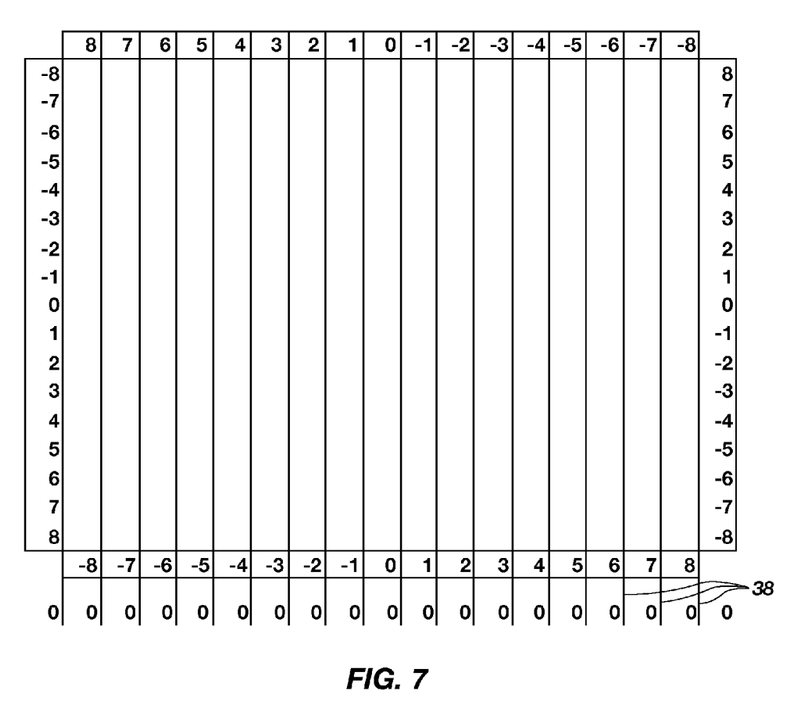
FIG. 7 is a diagram showing additional detail of the electrode grid that is combined with the alternative near field communication antenna.

FIG. 4 is an illustration of the application of a stimulus signal on the near field communication antenna 50. One side of the near field communication antenna 50 may be grounded 80, while the other side 82 has a stimulus signal applied. Disadvantageously, the result may be a coupling of a net change in voltage of approximately half of the maximum applied voltage on the electrodes 40 shown in FIG. 3.

To overcome this problem of coupling voltage onto the electrodes 38, a stimulus signal source is used as shown in FIG. 3. FIG. 3 shows that there are stimulus signals 84, 86 on each end of the near field communication antenna 50. The stimulus signals 84, 86 may be 180 degrees out of phase with respect to each other. The effect of the stimulus signals 84, 86 may be a coupling of a net change in voltage of approximately zero volts on the electrodes 38 shown in FIG. 3.

Another way to characterize the stimulus signals 84, 86 is to say that they form a differential signal source. The same amount of current may still be applied to the near field communication antenna 50, but by using the differential signals 84, 86, the near field communication antenna may no longer be radiating a signal that is being coupled to the electrodes 38. Thus, the configuration of the near field communication antenna 50 still radiates a magnetic field, but the differential signals 84, 86 may eliminate or substantially reduce the electrostatic field.

It is an aspect of the present invention that the design of the electrodes that will reduce or substantially eliminate induced currents caused by operation of the near field antenna may be changed from the examples illustrated herein. However, any such changes are considered to be within the scope of the principles of the present invention and should be considered to be within the scope of the claims herein.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:
1. A method for reducing induced current in electrodes of a touch sensing device that is operating adjacent to a near field communication antenna, said method comprising:
  1) providing a plurality of electrodes that form a sensing area used in a touch sensing device;
  2) providing a near field communication antenna disposed adjacent to the plurality of electrodes; and
  3) reducing induced current in the plurality of electrodes caused by operation of the near field communication antenna by configuring the electrodes to reduce the effect of electromagnetic fields generated by the near field communication antenna by arranging the plurality of electrodes to form the sensing area having a series of parallel rows of electrodes extending from a top edge to a bottom edge of the sensing area, each of the plurality of electrodes being electrically separate from each other, each of the plurality of electrodes following a first path that is beginning at a first edge and terminating at an opposite second edge of the sensing area; and
  4) increasing a length of at least one of the plurality of electrodes that is affected by the electromagnetic fields by increasing the length beginning from the second edge and extending back towards the first edge along a second path that is parallel to the first path to thereby reduce current that is induced in the at least one of the plurality of electrodes.

2. The method as defined in claim 1 wherein the method further comprises increasing the length of the plurality of electrodes that are nearest to the top edge and the bottom edge of the sensing area because these electrodes will be most affected by the electromagnetic fields.

3. The method as defined in claim 2 wherein the method further comprises increasing the length of any of the plurality of electrodes that are having currents induced in them by the electromagnetic fields to thereby reduce induced currents in all of the plurality of electrodes.

4. The method as defined in claim 1 wherein the method further comprises reducing the induced current such that the induced current in the electrodes is substantially canceled.

5. The method as defined in claim 1 wherein the method further comprises forming the near field communication antenna as at least one loop that is disposed around an outer edge of the sensing area.

6. The method as defined in claim 5 wherein the method further comprises disposing the near field communication antenna in a plane that is substantially parallel to a plane of the plurality of electrodes.

7. The method as defined in claim 1 wherein the method further comprises arranging the plurality of electrodes to form a sensing area having a plurality of concentrically aligned electrode loops, the loops all being electrically open at a first location, and having a connection to touch sensing circuitry at an opposite second location, each of the electrode loops thereby having two arms of substantially equal length, the induced current in a first arm of each of the plurality of concentrically aligned electrode loops being equal and opposite to the induced current in a second arm of each of the plurality of concentrically aligned electrode loops to thereby result in a reduced induced current in each of the plurality of concentrically aligned electrode loops.

8. A system for reducing induced current in electrodes of a touch sensing device that is operating adjacent to a near field communication antenna, said system comprised of:
   a plurality of electrodes that form a sensing area used in a touch sensing device;
   a near field communication antenna disposed adjacent to the plurality of electrodes, the plurality of electrodes being configured so as to reduce the effect of electromagnetic fields generated by the near field communication antenna and thereby reducing induced current in the plurality of electrodes caused by operation of the near field communication antenna;
   a series of parallel rows of the plurality of electrodes extending from a top edge to a bottom edge of a sensing area, each of the plurality of electrodes being electrically separate from each other, each of the plurality of electrodes following a first path that is beginning at a first edge and terminating at an opposite second edge of the sensing area; and
   extending a length of at least one of the plurality of electrodes that is affected by the electromagnetic fields by increasing the length beginning from the second edge and extending back towards the first edge along a second path that is parallel to the first path to thereby reduce current that is induced in the at least one of the plurality of electrodes.

9. The system as defined in claim 8 wherein the system is further comprised of increased lengths of the plurality of electrodes that are nearest to the top edge and the bottom edge of the sensing area because these electrodes will be most affected by the electromagnetic fields.

10. The system as defined in claim 9 wherein the system further comprised of increased lengths of any of the plurality of electrodes that are having currents induced in them by the electromagnetic fields to thereby reduce induced currents in all of the plurality of electrodes.

11. The system as defined in claim 8 wherein the system is further comprised of the near field communication antenna formed as at least one loop that is disposed around an outer edge of the sensing area.

12. The system as defined in claim 8 wherein the system is further comprised of a plurality of concentrically aligned electrode loops forming a sensing area, the loops all being electrically open at a first location, and having a connection to touch sensing circuitry at an opposite second location, each of the plurality of concentrically aligned electrode loops thereby having two arms of substantially equal length, the induced current in a first arm of each of the plurality of concentrically aligned electrode loops being equal and opposite to the induced current in a second arm of each of the plurality of concentrically aligned electrode loops to thereby result in a reduced induced current in each of the plurality of concentrically aligned electrode loops.

\* \* \* \* \*